Apr. 10, 1923. 1,451,315

T. M. AVERY

HOOK FASTENER

Filed June 4, 1919

Witness
C. D. Kesler
Norris L. Sumby

Inventor
True M. Avery
By James L. Norris
Attorney

Patented Apr. 10, 1923.

1,451,315

UNITED STATES PATENT OFFICE.

TRUE M. AVERY, OF GLENS FALLS, NEW YORK, ASSIGNOR TO ARROW-GRIP MANUFACTURING CO., INC., OF GLENS FALLS, NEW YORK, A CORPORATION OF NEW YORK.

HOOK FASTENER.

Application filed June 4, 1919. Serial No. 301,620.

*To all whom it may concern:*

Be it known that I, TRUE M. AVERY, a citizen of the United States, residing at Glens Falls, in the county of Warren and State of New York, have invented new and useful Improvements in Hook Fasteners, of which the following is a specification.

This invention relates to improvements in hook-fasteners, proposing a hook-fastener of the anchored type, that is to say, a hook-fastener adapted to be rigidly secured to some relatively stationary support, and which is of special value and utility in association with so-called "steel" wheels, (i. e., wheels which include disc like side plates), for the purpose of securing one of the terminal link or eyes of a non-skid element, such, for example, as a cross-chain extending transversely over the tire.

The principal objects of the invention, briefly stated, are to provide a hook-fastener embodying the general combination of a single hook, a guard therefor and means for securing the guard in closed position with the various structural parts so formed and related as to promote facility in the operations of opening and closing the guard and securing the guard in closed position, to promote certainty in the closure of the hook by the guard and in the securement of the link or eye, and to eliminate any possibility of the guard being accidentally opened by pressure incident to some movement of the chain link under the conditions of use, particularly under the severe conditions of stress encountered in the use of non-skid appliances.

With the above objects in view the invention consists of a base which carries a hook and a pivoted guard movable in the plane of the hook combined with self-acting means cooperating with the guard for holding it in closed position but which, without manipulation, permits of the intentional opening of the guard under pressure applied thereto in a determined way and with an arrangement of the guard whereby, when closed, it projects perpendicularly from its pivot toward the hook with its outer end located substantially flush with the hook terminal, in such position resisting pressure applied from any angle from within the hook, and moreover is located laterally inward of the hook whereby it will not contact with any obstacles that may be located beyond the hook.

An embodiment of the invention is illustrated in the accompanying drawing, wherein:—

Similar characters of reference designate corresponding parts throughout the several views.

Figure 1:
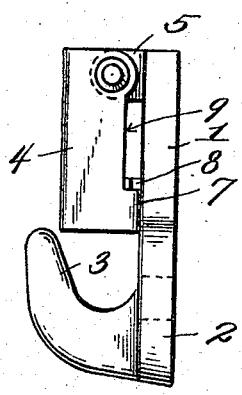
Figure 1 is a side elevation of a hook-fastener in which the features of the invention are incorporated.

The parts of the fastener are carried by a plate 1 which serves as a base and may be provided with apertured lugs 2 for its attachment to a relatively stationary support. The base 1 is provided with a laterally projecting hook 3 and with a guard 4 by which said hook is normally closed. The guard 4 preferably has the general structural characteristics of the guard or keeper disclosed in my co-pending application Serial No. 147,856 filed Feb. 10, 1917 and, as shown, consists of a part of U-shaped or channeled cross-section.

The guard 4 is movable in an extension of the plane of the hook and at its end remote from the hook is pivoted upon a lug 5 which projects laterally from the base 1 in overhanging relation to the hook.

Below the lug 5 the base is provided with a projecting lug 6 which overhangs the hook and has securing cooperation with the guard. In the construction shown and preferred, the side walls of the guard have inwardly extended resilient lips 7 and the lug 6 has a greater maximum width than the normal distance between the lips 7 and inward of its portion of greatest width is provided with recesses 8. Thus as the guard is moved inward to closed position its lips 7 spring over the portion of the lugs 6 of greatest width and project into the recesses 8, thereby securing the guard in closed position. When the guard is closed its lower end is substantially flush with the terminal of the hook 3 and completely obstructs the link passage between the hook and the base 1, thereby to retain the link or eye which is engaged with the hook. Moreover, when closed, the guard extends substantially perpendicularly from its pivot toward the hook and substantially parallel to the base 1 with the result that any displacement of the link or eye engaged with the hook, involving an application of pressure from within the hook against the lower end of the guard, will be without sensible effect in causing the guard to open.

As shown and preferred, the guard, when closed, is located inward relatively to the terminal of the hook whereby it will not encounter any obstructions located beyond the hook.

Figure 2:
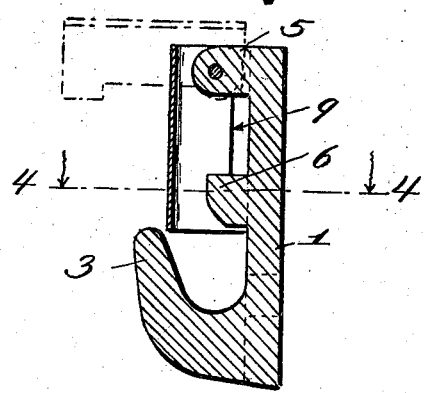
Figure 2 is a vertical central section.
Figure 3:
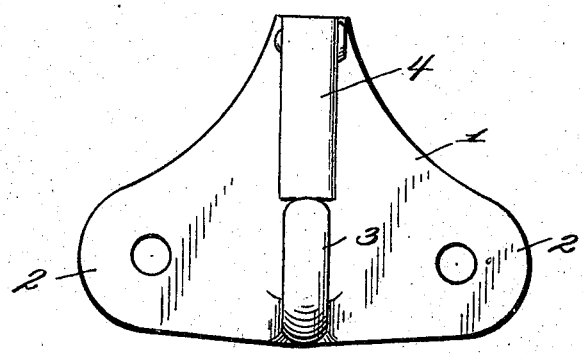
Figure 3 is a front elevation.
Figure 4:
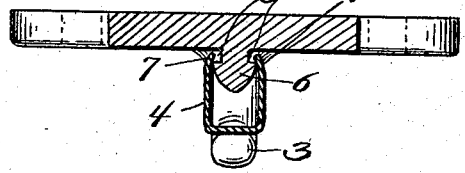
Figure 4 is a horizontal sectional view on the line 4—4 of Figure 2.

The guard is also provided with a suitable clearance for the introduction of an instrument, such as a screw driver, by which it may be pried open. As shown, the side walls have edge clearances 9 lying between the lips 7 and the pivot of the guard and through which, when the guard is closed, a screw driver or other implement may be inserted and, by manipulation against the guard and the base, used to open the guard against the resistance offered by the engagement of the lips 7 with the lug 6. The guard is shown by dotted lines in its open position in Figure 2, and in such position projects at a substantial right angle to the base 1, and is closed by moving it inward toward said base. The engagement of its lips 7 over the lug 6, as described, is an automatic incident of the closing movement of the guard. In the construction disclosed, the lips 7 as they project into the recesses 8 also bear against the base 1 and thereby limit the closing movement of the guard.

Having fully described my invention, I claim—

A hook fastener comprising a base for attachment to a relatively stationary object and provided with a laterally projecting hook adapted to be engaged by a link, a guard movable in the plane of the hook and pivoted to the base at its end remote from the hook in such relation that when positioned adjacent and substantially parallel to the base it extends substantially perpendicularly from its pivot toward the hook and with its lower end closes the link passage between the hook and the base, the guard and the base having companion elements which co-operate automatically when the guard is closed to secure the guard in closed position and the guard, by virtue of its perpendicular arrangement, maintaining its closed position despite any pressure thereon of the link engaged with the hook.

In testimony whereof I have hereunto set my hand in presence of two subscribing witnesses.

TRUE M. AVERY.

Witnesses:
GLENCORA BEAUDOIN,
CLAUDE C. WEBB.